United States Patent
Horiguchi et al.

(10) Patent No.: US 7,820,568 B2
(45) Date of Patent: Oct. 26, 2010

(54) LEATHER-LIKE SHEET AND PRODUCTION METHOD THEREOF

(75) Inventors: Tomoyuki Horiguchi, Otsu (JP); Kentaro Kajiwara, Otsu (JP); Satoru Shimoyama, Otsu (JP)

(73) Assignee: Toray Industries, Inc. (JP)

( * ) Notice: Subject to any disclaimer, the term of this patent is extended or adjusted under 35 U.S.C. 154(b) by 724 days.

(21) Appl. No.: 11/658,809

(22) PCT Filed: Aug. 1, 2005

(86) PCT No.: PCT/JP2005/014009
§ 371 (c)(1), (2), (4) Date: Jan. 29, 2007

(87) PCT Pub. No.: WO2006/013804
PCT Pub. Date: Feb. 9, 2006

(65) Prior Publication Data
US 2009/0130371 A1 May 21, 2009

(30) Foreign Application Priority Data
Aug. 2, 2004 (JP) .............................. 2004-225419

(51) Int. Cl.
*B32B 5/26* (2006.01)
(52) U.S. Cl. ............ 442/268; 442/189; 442/199; 442/276; 442/308; 442/311; 442/381; 442/402; 442/408; 442/362; 442/363; 428/91; 428/904; 156/148
(58) Field of Classification Search ............... 442/268, 442/276, 319, 381, 402, 408, 311, 199, 189, 442/308, 362, 363; 428/91, 904; 156/148
See application file for complete search history.

(56) References Cited

U.S. PATENT DOCUMENTS

| | | | | |
|---|---|---|---|---|
| 4,145,468 A | * | 3/1979 | Mizoguchi et al. | 442/269 |
| 5,256,429 A | | 10/1993 | Honda et al. | |
| 6,276,121 B1 | | 8/2001 | Nabeshima et al. | |
| 6,566,287 B1 | | 5/2003 | Mimura et al. | |
| 6,706,843 B1 | | 3/2004 | Ishihara et al. | |
| 2001/0027246 A1 | | 10/2001 | Murayama et al. | |
| 2004/0084134 A1 | * | 5/2004 | Tai | 156/176 |
| 2004/0175542 A1 | * | 9/2004 | Miyasaka | 428/141 |
| 2005/0118394 A1 | * | 6/2005 | Tanaka et al. | 428/151 |

FOREIGN PATENT DOCUMENTS

| | | |
|---|---|---|
| EP | 1 722 029 | 11/2006 |
| JP | 54-116417 | 9/1979 |
| JP | 54-116417 A | 9/1979 |
| JP | 61-275483 | 12/1986 |

(Continued)

*Primary Examiner*—Norca L Torres-Velazquez
(74) *Attorney, Agent, or Firm*—DLA Piper LLP (US)

(57) ABSTRACT

A leather-like sheet excellent in repulsive feeling is provided by a leather-like sheet substantially including a fibrous material which is a leather-like sheet in which a staple fiber nonwoven fabric (A) in which ultra-fine fibers of an average single fiber fineness of 0.0001 to 0.5 dtex and an average fiber length of 1 to 10 cm are entangled with each other and a woven or knitted fabric (B) including a conjugate fiber in which two or more polyesters are disposed in side-by-side or eccentric sheath-core relationship are laminated.

19 Claims, 2 Drawing Sheets

FOREIGN PATENT DOCUMENTS

| | | |
|---|---|---|
| JP | 63-042021 | 2/1988 |
| JP | 63-42021 A | 2/1988 |
| JP | 04-308271 | 10/1992 |
| JP | 4-308271 A | 10/1992 |
| JP | 05-078986 | 3/1993 |
| JP | 05-171014 | 7/1993 |
| JP | 05339863 | 12/1993 |
| JP | 10/131058 | 5/1998 |
| JP | 10-131058 A | 5/1998 |
| JP | 11-43835 | 2/1999 |
| JP | 11-323740 | 11/1999 |
| JP | 11-323740 A | 11/1999 |
| JP | 2000-336581 | 12/2000 |
| JP | 2000-336581 A | 12/2000 |
| JP | 2001-348457 A | 12/2001 |
| JP | 2003-221791 | 8/2003 |
| JP | 2003-221791 A | 8/2003 |
| JP | 2003-286667 | 10/2003 |
| WO | 99/23289 | 5/1999 |
| WO | 99/23289 A1 | 5/1999 |
| WO | 01/30729 | 5/2001 |
| WO | 01/30729 A1 | 5/2001 |
| WO | WO 03/064756 A1 * | 8/2003 |
| WO | WO 03/093547 A1 * | 11/2003 |

* cited by examiner

LEATHER-LIKE SHEET AND PRODUCTION METHOD THEREOF

RELATED APPLICATION

This is a §371 of International Application No. PCT/JP2005/014009, with an international filing date of Aug. 1, 2005 (WO 2006/013804 A1, published Feb. 9, 2006), which is based on Japanese Patent Application No. 2004-225419, filed Aug. 2, 2004.

TECHNICAL FIELD

This disclosure relates to a leather-like sheet and production method thereof.

BACKGROUND

So called "leather-like" sheets such as synthetic leather, artificial leather or the like which comprise ultra-fine fibers and a polymer elastomer has excellent characteristics which are not shown in natural leathers, and widely used in various applications. For producing such a synthetic leather or an artificial leather, wet coagulation methods in which after impregnating a fibrous sheet-like product with a solution of polymer elastomer such as polyurethane and then said fibrous sheet-like product is immersed in water or an aqueous organic solvent to wet-coagulate the polymer elastomer, is generally applied (for example, JP-A-2000-336581).

However, in order to achieve a high strength or a dimensional stability, a much amount of polyurethane is used, and, therefore, leather-like sheets are expensive due to material cost of polyurethane and complexity of production process, etc. Furthermore, organic solvents compatible with water such as N,N'-dimethylformamide are used in the process of impregnating with polyurethane, but these organic solvents are not preferable in view of working circumstance.

In addition, it is pointed out that, when the polymer elastomer becomes rich, the hand of leather-like sheet may become rubber like, and dense feeling similar to natural leathers may not be obtained. Furthermore, it is not preferable to contain a polymer elastomer, not only in view of the hand, but also in view of recyclability of which much is made for the purpose of protecting environment and resources. For example, for recycling methods of polymers, a recycling method of polyesters by decomposition or a recycling method of polyurethane by decomposition is being investigated, but these methods are mainly applied to polymers of a single component. As stated above, in a composite material in which a fiber and a polymer elastomer are integrated, it becomes difficult to apply those methods because the methods of pyrolysis of the respective polymers are different. Accordingly, it becomes necessary to separate the fiber and the polymer elastomer, but it is generally very costly and it is also impossible to separate those perfectly.

Other than that, a yellowing problem of polyurethanes or the like with NOx gas is pointed out, and there remain various problems such that it is difficult to obtain a white suede-like sheet.

In view of these, a leather-like sheet in which polymer elastomer such as polyurethane is decreased or they are substantially not contained, is desired.

However, as a result of our efforts to obtain a leather-like sheet which substantially does not contain a polymer elastomer, we found that it is difficult to obtain a leather-like sheet with a hand having a repulsive feeling similar to that which comprises a polymer elastomer. This means that it is difficult to satisfy various consumers' needs, and it is desired to solve this problem.

However, with respect to a leather-like sheet which does not contain a polymer elastomer, almost no investigation has been made, and it is the present situation that means for solving this problem has not been found.

SUMMARY

We provide a leather-like sheet substantially comprising a fibrous material, wherein a staple fiber nonwoven fabric (A), in which ultra-fine fibers of an average single fiber fineness of about 0.0001 to about 0.5 dtex and an average fiber length of about 1 to about 10 cm are entangled with each other, and a woven or knitted fabric (B), comprising a conjugate fiber in which two or more polyesters are disposed in side-by-side or eccentric sheath-core relationship, are laminated.

We also provide a method of producing a leather-like sheet comprising obtaining an ultra-fine staple fiber nonwoven fabric (A'), in which staple fibers convertible into ultra-fine fibers of an average single fiber fineness of about 1 to about 10 dtex which are convertible into ultra-fine fibers of an average single fiber fineness of about 0.0001 to about 0.5 dtex and an average fiber length of about 1 to about 10 cm are entangled by needle punching and then converted into ultra-fine fibers, and laminating the nonwoven fabric (A') on a woven or knitted fabric (B) comprising a conjugate fiber in which two or more polyesters are disposed in side-by-side or eccentric sheath-core relationship and subjecting to a fluid jet treatment at a pressure of at least about 10 MPa to entangle the ultra-fine fibers in the nonwoven fabric (A') with each other to convert it into a nonwoven fabric (A) simultaneously with entangling the nonwoven fabric (A) and the woven or knitted fabric (B).

It is therefore possible to provide a leather-like sheet excellent in repulsive feeling, although it is a leather-like sheet substantially comprising a fibrous material. The leather-like sheet can preferably be used for clothes, materials, furniture and the like.

DETAILED DESCRIPTION

The leather-like sheet includes a staple fiber nonwoven fabric (A) (hereunder, referred to as the nonwoven fabric (A)) in which ultra-fine fibers of an average single fiber fineness of about 0.0001 to about 0.5 dtex and an average fiber length of about 1 to about 10 cm are entangled with each other. By this feature, it becomes possible to obtain a hand or a surface feeling similar to natural leathers.

The nonwoven fabric (A) comprises a staple fiber of average fiber length of about 1 to about 10 cm. The average fiber length is preferably about 1.5 to about 8 cm, more preferably about 2 to about 6 cm. If the average fiber length exceeds about 10 cm, it is not preferable since surface appearance becomes poor. On the contrary, if the average fiber length is less than about 1 cm, an abrasion resistance of the nonwoven fabric decreases. Fibers of which fiber length exceeds about 10 cm or is less than about 1 cm may be used. A content of fibers of which fiber length exceeds about 10 cm or is less than about 1 cm is preferably about 30% or less in number of fibers constituting the nonwoven fabric (A), more preferably about 10% or less, and it is most preferable that they are not contained entirely.

The nonwoven fabric (A) comprises ultra-fine fibers of an average single fiber fineness of about 0.0001 to about 0.5 dtex. The average single fiber fineness is preferably about 0.001 to about 0.3 dtex, more preferably about 0.005 to about 0.15 dtex. If the average single fiber fineness is less than about 0.0001 dtex, it is not preferable since the strength of leather-like sheet decreases. On the contrary, if the average single fiber fineness exceeds about 0.5 dtex, it is not preferable since it causes trouble such that the hand of leather-like sheet becomes hard, or the entanglement of fibers becomes insufficient to make surface appearance of the leather-like sheet poor, or to lower the abrasion resistance. However, in the range which does not spoil the effect, fibers of which single fiber fineness are less than about 0.0001 dtex or fibers of which single fiber fineness exceeds about 0.5 dtex may be contained. The content of the fibers of which single fiber fineness are less than about 0.0001 dtex or fibers of which single fiber fineness exceed about 0.5 dtex is preferably about 30% or less, in number, of the fibers constituting the nonwoven fabric (A), more preferably about 10% or less, and it is most preferable that they are not contained entirely.

Figure 4:
FIG. 4: A cross sectional view showing an example of the staple fiber nonwoven fabric (A) in which ultra-fine fibers are entangled with each other.
Figure 5:
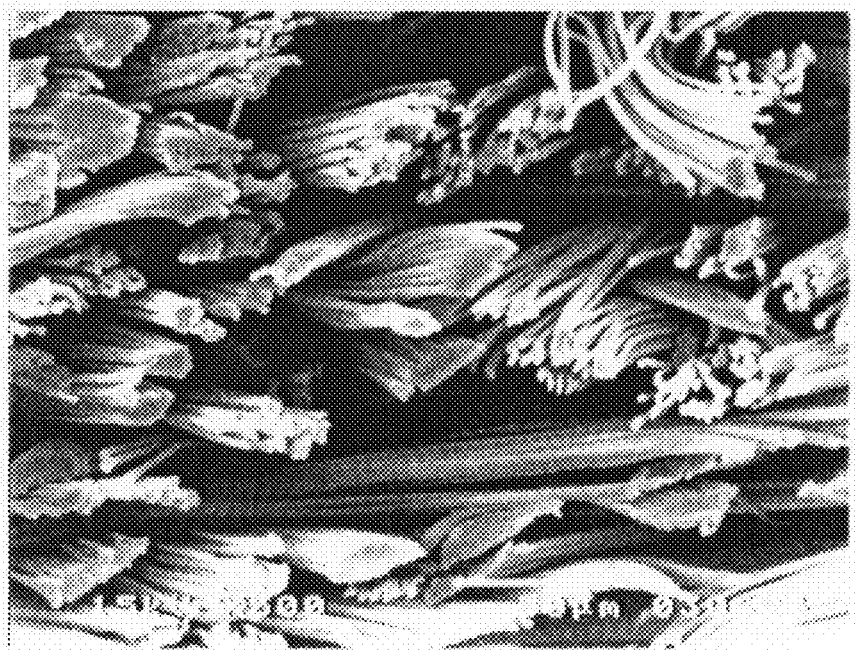
FIG. 5: A cross sectional view showing an example of staple fiber nonwoven fabric having a structure in which ultra-fine fibers are entangled in a bundle state.

It is especially important that these ultra-fine fibers are entangled with each other to improve abrasion resistance of the leather-like sheet. Most of conventional leather-like sheets comprising ultra-fine fibers have structures entangled in a state of bundle of fibers in which ultra-fine fibers are grouped, as shown in FIG. 5. However, in the structure entangled in the state of bundle of fibers, an effect of abrasion resistance which is expected in the present invention is not obtained. As shown in FIG. 4, it is necessary for improving abrasion resistance to have a structure in which ultra-fine fibers are entangled with each other. Further, in the range in which the effect is not spoiled, a structure entangled in a state of bundle of fibers may be contained.

In addition, a woven or knitted fabric (B) comprising a conjugate fiber, in which two or more polyesters are adhered in side-by-side or eccentric sheath-core relationship, has an effect of imparting an excellent repulsive feeling to the leather-like sheet. The woven or knitted fabric mentioned here is a generic name of fiber structure of which constituting element is a fiber, including woven fabrics and knitted fabrics. In the woven or knitted fabric (B), if it comprises such a conjugate fiber, an ordinary fiber may also be contained as far as it does not spoil the effect. That is, for example, a composite yarn in which the above-mentioned conjugate fiber and an ordinary fiber is plied, may be used. Or, the above-mentioned conjugate fiber may be used only for a weft or warp while an ordinary fiber is used for the other side.

The polyester is, for example, polymers such as polyethylene terephthalate, polytrimethylene terephthalate and polybutylene terephthalate. Two or more polyesters means to use two or more kinds of polyesters of which physical or chemical properties are different. That is, that two or more polyester are adhered in side-by-side or eccentric sheath-core relationship means that two or more polyesters different in physical or chemical properties are adhered along the fiber length in side-by-side or eccentric sheath-core orientation. Accordingly, by a physical or chemical factor, it is possible to develop crimp in the conjugate fiber. In view of easiness of developing crimp, it is preferable to use two or more kinds of polyesters different in heat shrinkage. In this way, by subjecting the above-mentioned conjugate fiber to a relaxation treatment, it is possible to easily develop crimp. By developing the crimp of the conjugate fiber, it is possible to obtain a leather-like sheet excellent in repulsive feeling. As the polyesters different in heat shrinkage, for example, those different in polymerization degree, those blended with other polymer, or the like are mentioned. To obtain a leather-like sheet particularly excellent in repulsive feeling, a conjugate fiber in which a low viscosity polyester of an intrinsic viscosity of about 0.35 to about 0.45 and a high viscosity polyester of intrinsic viscosity of about 0.65 to about 0.85 are combined is preferable. In such a case, in general, the high viscosity polyester shows a higher heat shrinkage than the low viscosity polyester. If the intrinsic viscosity of the low viscosity polyester is less than about 0.35, it is not preferable since the spinning stability decreases. On the contrary, if the intrinsic viscosity of the low viscosity polyester exceeds about 0.45, it is also not preferable since the repulsive feeling of leather-like sheet decreases. If the intrinsic viscosity of the high viscosity polyester exceeds about 0.85, it is not preferable since the spinning stability decreases. If the intrinsic viscosity of high viscosity polyester is less than about 0.65, it is not preferable since the repulsive feeling of leather-like sheet decreases. To obtain a leather-like sheet excellent in repulsive feeling, the difference of the intrinsic viscosity between the low viscosity polyester and the high viscosity polyester is preferably in the range of about 0.20 to about 0.40. Here, as the intrinsic viscosity ($\eta$), the value measured at about 25° C. as a solution in o-chlorophenol was used.

With respect to the conjugate ratio of the two or more polyesters, in view of spinnability and dimensional uniformity of coil along the fiber length direction when a crimp is developed, it is preferable to be in the range of high shrinkage component: low shrinkage component=75:25 to 35:65 (wt %), more preferably, in the range of 65:35 to 45:55.

With respect to the conjugate configuration, both of a side-by-side and an eccentric sheath-core relationship are acceptable, but side-by-side relationship is preferable because a leather-like sheet excellent in repulsive feeling can be obtained.

The average single fiber fineness of the conjugate fiber is not especially limited, but it is preferable to be about 1 to about 15 dtex. If it is less than about 1 dtex, an excellent repulsive feeling may not be obtained and if it exceeds about 15 dtex, a hand of the leather-like sheet may become hard.

Figure 1:
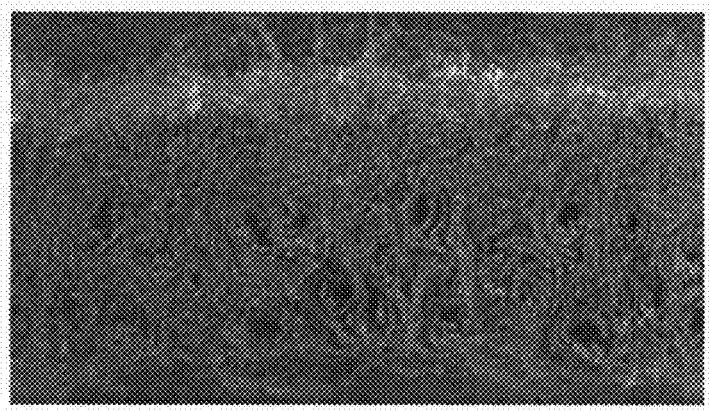
FIG. 1: A cross sectional view of the leather-like sheet obtained in Example 1.

In addition, to obtain a leather-like sheet excellent in repulsive feeling, it is preferable that fibers comprising the above-mentioned conjugate fiber constitute a multi-filament and a group of the multi-filament forms a spiral structure to form a hollow structure in center of the spiral structure along the length direction. An example of cross section of such a leather-like sheet is shown in FIG. 1. By such a hollow structure being formed, the repulsive feeling of leather-like sheet is further improved. However, it is not necessary that all fibers contained in the woven or knitted fabric (B) are in such a structure, and by such a hollow structure being formed only partly, there is still an effect of improving repulsive feeling of the leather-like sheet.

Furthermore, to obtain this preferable structure easily, it is preferable that a twist number of the multi-filament is about 500 to about 3000 T/m, more preferably, it is about 800 to about 2000 T/m. In a case where monofilament is dispersed, or phase of crimp slips, since the preferable structure may not be obtained, it is preferable to be grouped by an air interlacing treatment or the like.

With respect to the woven or knitted fabric (B), it is not especially limited and woven fabrics such as plain weave, twill weave, satin weave or the like are mentioned. In case of knitted fabric, circular knit, tricot, raschel knit or the like are mentioned. Among them, for obtaining a leather-like sheet excellent in repulsive feeling, a woven fabric is preferable, and furthermore, in view of cost, plain weave is preferable. On the other hand, for obtaining a leather-like sheet excellent in drapability, a knitted fabric is preferable. With a knitted fabric, it is possible to balance a moderate repulsive feeling with drapability.

Furthermore, the weight per unit area of the woven or knitted fabric (B) can suitably be adjusted based on the weight per unit area of the leather-like sheet. With respect to the weight per unit area of the woven or knitted fabric (B), in the case of clothes, it is preferable to be about 10 to about 150 $g/m^2$, more preferably, it is about 30 to about 100 $g/m^2$. In the case where the weight per unit area of the woven or knitted fabric (B) is less than about 10 $g/m^2$, the shape of the woven or knitted fabric (B) is unstable, and its handling becomes worse, and a desired repulsive feeling of a leather-like sheet to be made may not be obtained. In the case where the weight per unit area of the woven or knitted fabric (B) exceeds about 150 $g/m^2$, it is not preferable since the drapability of the leather-like sheet obtained decreases. On the other hand, when it is used as furniture or as a car sheet, it is preferable to be about 50 to about 400 $g/m^2$. If it is less than about 50 $g/m^2$, it is poor in compactness and moldability may become insufficient, and if it exceeds about 400 $g/m^2$, it is not preferable since moldability may become poor.

As far as the above-mentioned nonwoven fabric (A) and the woven or knitted fabric (B) are laminated, other nonwoven fabric or a woven or knitted fabric may further be laminated. It may be laminated in 3 layers or more, for example, the nonwoven fabric (A)/the woven or knitted fabric (B)/a nonwoven fabric, the nonwoven fabric (A)/a nonwoven fabric/the woven or knitted fabric (B), the nonwoven fabric (A)/the woven or knitted fabric (B)/a nonwoven fabric/a woven or knitted fabric/a nonwoven fabric, or the like. In particular, in case where the leather-like sheet has a front surface and a back surface and a good quality is also required on the back surface, it is preferable that both of the front and back surfaces comprise nonwoven fabric. For example, a 3 layers structure in which the nonwoven fabric (A) as the front surface, the woven or knitted fabric (B) as the intermediate layer, the nonwoven fabric (A) or other nonwoven fabric as the back surface are disposed, is preferable, However, if drapability is the first priority, 2 layers structure is preferable.

A weight ratio of the woven or knitted fabric (B) is preferably about 5 to about 50% of the total weight of the leather-like sheet, more preferably about 10 to about 40%. If the weight ratio is less than about 5%, it becomes difficult to sufficiently reflect the repulsive feeling of the woven or knitted fabric (B) to the leather-like sheet. On the other hand, if the weight ratio exceeds about 50%, a hand of the leather-like sheet becomes like that of the woven or knitted fabric and it is difficult to obtain a high quality feeling as a leather-like sheet.

However, for achieving an excellent quality feeling on the back surface, a nonwoven fabric for the back surface is preferably the above-mentioned nonwoven fabric (A) or a staple fiber nonwoven fabric (C) in which ultra-fine fibers of an average fiber length of about 0.1 to about 1 cm are entangled with each other (hereunder, referred to as the nonwoven fabric (C)). The ultra-fine fibers constituting the nonwoven fabric (C) preferably have an average single fiber fineness in the range of about 0.01 to about 0.5 dtex, in view of excellence of quality of the leather-like sheet to be obtained. Furthermore, the ultra-fine fibers constituting the nonwoven fabric (C) preferably have an average fiber length in the range of about 0.1 to about 1 cm to reduce weight per unit area of the leather-like sheet to be obtained and to achieve an excellent drapability. Furthermore, the nonwoven fabric (C) preferably has a structure, similar to the above-mentioned nonwoven fabric (A), in which ultra-fine fibers are entangled with each other, for improving abrasion resistance.

With respect to the material of the nonwoven fabric (C), it is not especially limited, but polyester is preferable since it is preferable to be the same material as the nonwoven fabric (A) or the woven or knitted fabric (B), in view of dyeability or recyclability.

With respect to the nonwoven fabric (C), it is preferable to be made by a wet laid method, because it is easy to reduce weight per unit area and it is possible to improve quality without an unnecessary increase of total weight per unit area of the leather-like sheet. However, since it is difficult to achieve a high abrasion resistance by the nonwoven fabric (C), for applications which require a high abrasion resistance, the above-mentioned nonwoven fabric (A) is preferable.

Furthermore, to improve abrasion resistance, it is preferable that the leather-like sheet of the present invention contains fine particles. By imparting the fine particles to the leather-like sheet, it also becomes possible to obtain an effect of giving hands such as dry feeling or scrooping feeling. The material for the fine particles is not especially limited as far as it is insoluble to water, for example, inorganic materials such as silica, colloidal silica, titanium dioxide, aluminum, mica, or organic materials such as melamine resin can be exemplified.

In addition, the average particle diameter of the fine particles is, preferably, about 0.001 to about 30 μm, more preferably, about 0.01 to about 20 μm, still more preferably, about 0.05 to about 10 μm. In the case where the average diameter of the fine particles is less than about 0.001 μm, the desired effect may not be obtained. On the other hand, in the case where the average particle diameter of the fine particles exceeds about 30 μm, washing durability may decrease due to falling off of the fine particles. The average particle diameter of the fine particles can be measured by methods suitable for respective material and size, for example, by the BET method, the laser method, the dynamic scattering method, the coal-tar method, etc. It is especially preferable to use the volume (mass) average particle diameter obtained by the BET method.

With respect to these fine particles, an amount to be used can properly be changed as far as the effect can be exhibited. The amount of the fine particles contained is, preferably, about 0.01 to about 10 wt % of the leather-like sheet, more preferably, about 0.02 to about 5 wt %, still more preferably, about 0.05 to about 1 wt %. If the amount contained is about 0.01 wt % or more, improving effect of abrasion resistance can be exhibited remarkably and as the amount increases, the effect may become larger. However, in case where the amount contained exceeds about 10 wt %, it is not preferable since the hand of leather-like sheet becomes hard.

To prevent falling off of the fine particles, and to improve durability, it is preferable to use a small amount of resin together.

Furthermore, to obtain a soft hand and a smooth surface touch, it is preferable that the leather-like sheet of the present invention contains a softening agent. As the softening agent, it is preferable to properly select those which are generally used for woven or knitted fabric according to the kind of fiber. For example, those described in Dyeing Note, 23$^{rd}$ edition (publisher, Shikisensha Co., Ltd.; published on Aug. 31, 2002) under the name of hand improver or softening agent can be properly selected. Among them, because the softening effect is excellent, a silicone based emulsion is preferable, and an amino-modified or epoxy-modified silicone based emulsion is more preferable. In the case where such a softening agent is contained, since abrasion resistance may decrease, it is preferable to properly control the amount of the softening agent and the amount of the above-mentioned fine particles, while well balancing the hand and abrasion resistance as desired. Accordingly, an amount of the softening agent is not especially limited, but if it is too small, its effect cannot be exhibited and, if it is too large, a wet feeling remains and, generally, it is preferable to be in the range of about 0.01 to about 10 wt % of the leather-like sheet.

The weight per unit area of the leather-like sheet is preferably about 150 to about 550 g/m$^2$, more preferably about 150 to about 500 g/m$^2$, still more preferably about 200 to about 450 g/m$^2$. If the weight per unit area of leather-like sheet is less than about 150 g/m$^2$, it is not preferable since a good repulsive feeling may not be obtained. On the other hand, in the case where the weight per unit area of the leather-like sheet exceeds about 550 g/m$^2$, it also is not preferable since processability in various applications may become worse. Furthermore, an apparent fiber density of the leather-like sheet is preferably about 0.25 to about 0.70 g/cm$^3$, more preferably about 0.29 to about 0.60 g/cm$^3$, still more preferably about 0.30 to about 0.45 g/cm$^3$. If the apparent fiber density is less than about 0.25 g/cm$^3$, it is not preferable since abrasion resistance especially decreases. Furthermore, if the apparent fiber density exceeds about 0.70 g/cm$^3$, it is also not preferable since processability in various applications may become worse.

With respect to the leather-like sheet, in the abrasion test measured according to JIS L 1096 (1999) 8.17.5 E method (Martindale method) by the load for furniture (12 kPa), it is preferable that an abrasion loss in mass of test cloth after about 20000 cycles of abrasion on at least one surface is about 20 mg or less, and a number of pills is about 5 or less. The abrasion loss in mass is more preferably about 15 mg or less, still more preferably about 10 mg or less. It is more preferable that a number of pills is about 3 or less, still more preferably about 1 or less. In case where the abrasion loss in mass exceeds about 20 mg, it is not preferable since nap may attach to clothes or the like in practical use. On the other hand, a lower limit is not decided, and it is also possible to obtain the leather-like sheet with almost no abrasion loss in mass. With respect to pills generated, if it exceeds about 5, it is not preferable since the quality becomes poor due to a change of surface appearance when used.

With respect to the leather-like sheet, it is preferable that a drape coefficient is about 0.10 to about 0.50, more preferably about 0.15 to about 0.40, still more preferably about 0.20 to about 0.30. If the drape coefficient is less than about 0.10, the leather-like sheet is too soft and has low stiffness, and it is not suitable for clothes. On the other hand, if the drape coefficient exceeds about 0.50, it becomes impossible to use as clothes which are soft and excellent in drapability.

The node number of the leather-like sheet is preferably about 5 to about 15, more preferably about 6 to about 10, still more preferably about 7 to about 10. If the node number is less than about 5, it becomes difficult that the leather-like sheet exhibit a beautiful silhouette. As the node number of the leather-like sheet becomes larger, the drapability becomes better, but if the node number is too large, it becomes difficult to obtain a leather-like hand and, therefore, its upper limit is about 15.

The drape coefficient can be measured by a drape tester. The number of pleats counted in a projection obtained in the test of drape coefficient is defined as a node number. The drape coefficient and the node number are measured both on front and back surfaces, and averages thereof are defined as the respective values.

The leather-like sheet can have an excellent surface appearance like that of natural leather. It is preferable that the leather-like sheet has, with naps on one surface, a smooth touch and excellent writing effect like those of suede or nubuck.

Among leather-like sheets, those generally called as synthetic leather or artificial leather comprise a polymer elastomer such as polyurethane and a fiber material. However, the leather-like sheet substantially comprises fibrous material to solve the above-mentioned various problems, for example, recyclability, dyeability, light resistance, yellowing resistance, etc. "Substantially comprise" means that it substantially does not contain a polymer elastomer. Furthermore, "substantially does not contain a polymer elastomer" means that it permits the presence of a polymer elastomer in a range which does not spoil the effect. Concretely, it is preferable that the polymer elastomer contained in the leather-like sheet is about 5 wt % or less, more preferably about 3 wt % or less, still more preferably about 1 wt % or less, most preferably it does not contain a polymer elastomer entirely. In addition, it is preferable that the fiber material is made from a non-elastomeric polymer. Concretely, fibers such as made from polyester, polyamide, polypropylene, polyethylene, are preferably used. Fibers excellent in rubber-like elasticity such as polyether ester based fiber or polyurethane based fibers such as so-called "spandex" fiber, are not preferred.

As polyesters, they are not especially limited as far as it is possible to be made into a fiber. Concretely, for example, polyethylene terephthalate, polytrimethylene terephthalate, polytetramethylene terephthalate, polycyclohexylene dimethylene terephthalate, polyethylene-2,6-naphthalene dicarboxylate, polyethylene-1,2-bis(2-chlorophenoxy)ethane-4, 4'-dicarboxylate or the like are mentioned. Among them, polyethylene terephthalate or copolyesters mainly comprising ethyleneterephthalate unit which are most widely used, are preferably used.

As polyamides, for example, polymers having an amide bond such as Nylon 6, Nylon 66, Nylon 610, Nylon 12, can be mentioned.

In view of recyclability or dyeability, it is preferable that the nonwoven fabric (A) and the woven or knitted fabric (B) are of the same material. In this respect, it is preferable that the material constituting the nonwoven fabric (A) is a polyester.

To these polymers, to improve dulling power, an inorganic particle such as titanium dioxide particle may be added. Other than that, a lubricant, a pigment, a heat stabilizer, an ultraviolet absorbent, an conductive agent, heat storage material, anti-bacterial agent, etc., can be added according to various purposes.

In addition, for example, functional agents such as a dyestuff, softening agent, a hand modifier, an anti-pilling agent, anti-bacterial agent, a deodorant, a water repellent agent, a light resistant agent and a weather resistant agent may be contained as far as they do not spoil the effect.

Next, an example of production method of the leather-like sheet is explained.

First, a production method of the nonwoven fabric (A) is explained. The production method of ultra-fine fibers which constitute the nonwoven fabric (A) is not especially limited, and the ultra-fine fibers may be spun directly or an ordinary thickness fiber which is convertible into ultra-fine fibers (fiber convertible into ultra-fine fibers) is spun and then it may be converted into ultra-fine fibers. As methods in which the fiber convertible into ultra-fine fibers is used, for example, i.e., a method in which an islands-in-sea type conjugate fiber is spun and then the sea component is removed, a method in which a splittable fiber is spun and then it was split, or the like, can be exemplified. Among them, it is preferable that the leather-like sheet is produced by using the islands-in-sea type conjugate fiber or the splittable fiber in view of being able to easily and stably obtain ultra-fine fibers and being able to easily achieve the structure of the leather-like sheet. Furthermore, in view of being able to obtain ultra-fine fibers of a same material, it is more preferable to produce by using an islands-in-sea type conjugate fiber. For example, it is preferable that the ultra-fine fibers consist of polyester alone, or polyamide alone. Furthermore, as mentioned above, since it is preferable that the nonwoven fabric (A) and the woven or knitted fabric (B) are of a same material, as a material of the nonwoven fabric (A), polyester is more preferable.

"Of a same material" includes, for example, in the case of polyester, using polyesters selected from the above-mentioned various polyesters in combination. The same can be said in the case of polyamide or all other polymers. In a combination of such a range, it is easy to carry out a practically sufficient dyeing. When different materials, for example, a polyester and a polyamide are used in combination, since there is difference in dyeability or color fastness, a color unevenness may occur when dyed. However, in view of recyclability, it is especially preferable to use a perfectly same material only, for example, polyethylene terephthalate only.

The islands-in-sea type conjugate fiber mentioned here is a fiber in which two or more components are composited or blended to thereby make an islands-in-sea type configuration. As methods for obtaining the islands-in-sea type conjugate fiber, for example, (1) a method of blending polymers of two or more components in pellet state and then carrying out spinning; (2) a method of kneading and palletizing polymers of two or more components beforehand, and then carrying out spinning; (3) a method of blending molten polymers of two or more components in a pack of a spinning machine by a static mixer or the like; (4) a method of letting join molten polymers of two or more components in a spinneret by using spinnerets described in JP-B-S44-18369, JP-A-S54-116417, etc. are mentioned. The islands-in-sea type conjugate fiber can be produced by any one of the above-mentioned methods, but the method of the above (4) is preferably used, in view of easiness of selecting polymers.

In method of the above (4), cross sectional shapes of the islands-in-sea type conjugate fiber and the island fiber obtainable by removing the sea component are not especially limited, but for example, circular, polygonal, Y, H, X, W, C and π types or the like are mentioned. Furthermore, the number of polymer kinds to be used is not especially limited, but when spinning stability or dyeability is considered, two or three components are preferable, especially, it is preferable to be constituted by two components of one sea component and one island component. In addition, the component ratio at this stage, as weight ratio of the island component to the total islands-in-sea type conjugate fiber, it is preferable to be about 0.3 to about 0.99, more preferably about 0.4 to about 0.97, still more preferably about 0.5 to about 0.8. When the weight ratio of the island component is less than about 0.3, it is not preferable in cost since removing ratio of the sea component becomes high. On the other hand, when weight ratio of the island component exceeds about 0.99, island components becomes are likely to join with each other, and it is not preferable in view of spinning stability.

In the case where the ultra-fine fibers are obtained from the islands-in-sea type conjugate fiber, the island component is converted to the aimed ultra-fine fibers. Polymers for the island component are not especially limited and fiber formable ones are suitably selected, but what is preferably used is the above-mentioned polyester or polyamide. Polymers used as the sea component is that which is incompatible with the island component and having chemical properties which are higher in solubility or decomposability to solvents or chemical substances to be used than polymers of the sea component. It depends on the selection of polymer constituting the island component, but for example, polyolefins such as polyethylene or polystyrene, copolyesters copolymerized with 5-sodium-sulfoisophthalic acid, polyethylene glycol, sodium dodecylbenzene sulfonate, a bisphenol A compound, isophthalic acid, adipic acid, dodecane dioic acid, cyclohexyl carboxylic acid, etc., can be preferably used. In view of spinning stability, polystyrene is preferable, but in view of being able to be easily removed without using an organic solvent, a copolyester having sulfonic group is preferable. As a copolymerization ratio of copolymerization component of these copolyesters, it is preferable to be about 5 mol % or more in view of treatment speed and stability, and about 20 mol % or less is preferable in view of easiness of polymerization, spinning and drawing. As preferable combinations in the present invention, combinations in which polyester, polyamide or both of them is used as the island component, and polystyrene or copolyester having a sulfone group as the sea component, are mentioned. To these polymers, to increase dulling ability, an inorganic particle such as titanium dioxide particle or the like may be added, and other than that, a lubricant, a pigment, a heat stabilizer, an ultra-violet absorber, an conductive agent, a heat storage material, an anti-bacterial agent, etc., can be added according to various purposes.

The islands-in-sea type conjugate fiber thus spun can be drawn and crystallized. For example, after taking up an undrawn yarn, it can be drawn by heat in wet or dry or in both in 1 to 3 stages. In the case where a splittable fiber is used, two or more components are composited mainly in a spinneret and it can be produced according the production method of the above-mentioned islands-in-sea type conjugate fiber.

Next, the obtained staple fiber convertible into ultra-fine fibers is made into a nonwoven fabric. For those methods, dry processes such as card, crosslapper and random webber, and wet processes such as wet laid process can be applied. A dry process in which two methods of entanglement, needle punching method and fluid jet treatment, are combined is preferable in view of being able to easily achieve the structure of the leather-like sheet. By a weight of fiber used to be made into the nonwoven fabric or a weight per unit area of the woven or knitted fabric or the like, a weight per unit area of the leather-like sheet can be suitably controlled.

Next, the dry process is explained. First, from the staple fiber convertible into ultra-fine fibers, a web is formed by a card, a crosslapper, or the like. An apparent fiber density of the obtained web is made, by a needle punching treatment, into, preferably, about 0.12 to about 0.30 $g/cm^3$, more preferably, about 0.15 to about 0.25 $g/cm^3$. In the case where the apparent fiber density is less than about 0.12 $g/cm^3$, an entanglement of fibers becomes insufficient and aimed values may not be obtained with respect to tensile strength, tear strength, abrasion resistance, etc., of the nonwoven fabric. On the other hand, an upper limit of the apparent fiber density is not especially limited, but if it exceeds about 0.30 g/cm$^3$, it is not preferable since it causes a breaking of needles or it leaves needle-punched holes behind.

Furthermore, when a needle punching is carried out, it is preferable that an average single fiber fineness of the fiber convertible into ultra-fine fibers is about 1 to about 10 dtex, more preferably about 2 to about 8 dtex, still more preferably about 2 to about 6 dtex. In the case where the average single fiber fineness is less than about 1 dtex or in case where it exceeds about 10 dtex, an entanglement by the needle punching is insufficient and it becomes difficult to obtain an ultra-fine staple fiber nonwoven fabric excellent in physical properties.

It is preferable that the needle punching is not for a tentative fixing to obtain processability, but for sufficiently entangling the fibers. Accordingly a punching density is preferably about 100 needles/cm$^2$ or more, more preferably about 500 needles/cm or more, still more preferably about 1000 needles/cm$^2$ or more.

It is preferable that the nonwoven fabric thus obtained is shrunk by heat in dry or wet or both, to thereby be further densified.

Next, by a treatment for making ultra-fine, ultra-fine fibers are made from the fiber convertible into ultra-fine fibers. Furthermore, by a fluid jet treatment, an entanglement of the ultra-fine fibers with each other is carried out. The fluid jet treatment may be carried out after the treatment for making ultra-fine, or the fluid jet treatment may be carried out simultaneously with the treatment for making ultra-fine. Or, the fluid jet treatment may be carried out simultaneously with the treatment for making ultra-fine and then, a fluid jet treatment may further be carried out. In case where the fluid jet treatment is carried out simultaneously with the treatment for making ultra-fine, it is preferable that a fluid jet treatment is also carried out at least after the treatment for making ultra-fine is almost finished, in order to enhance the entanglement of the ultra-fine fibers with each other. Carrying out a fluid jet treatment after carrying out the treatment for making ultra-fine is more preferable.

As the method of treatment for making ultra-fine, it is not especially limited, but for example, mechanical methods and chemical methods are mentioned. The mechanical methods mean methods in which the fiber convertible into ultra-fine fibers is made into ultra-fine by imparting a physical stimulation. Concretely, for example, other than methods of imparting an impact such as the above-mentioned needle punching method or water-jet punching method, a method of pressing between rollers, a method of carrying out an ultrasonic treatment, etc., are mentioned. On the other hand, as chemical methods, for example, methods of causing changes by chemicals such as swelling, decomposition, dissolving or the like, to at least one component constituting the islands-in-sea type conjugate fiber, are mentioned. In particular, a method in which a staple fiber nonwoven fabric is made with a fiber convertible into ultra-fine fibers in which an easily alkali-decomposable polymer is used as the sea component, and then it is made ultra-fine by treating with an aqueous neutral-alkali solution, is one of preferable embodiments of the present invention, because it does not use an organic solvent and is preferable in view of working environment. The aqueous neutral-alkali solution mentioned here means an aqueous solution which shows a pH of 6 to 14. For example, an aqueous solution of the above pH range containing an organic or inorganic salt can preferably be used. As the organic or inorganic salts, alkali metal salts such as sodium hydroxide, potassium hydroxide, lithium hydroxide, sodium carbonate and sodium hydrogen carbonate, alkali-earth metal salts such as calcium hydroxide and magnesium hydroxide, are mentioned. Furthermore, if necessary, amines such as triethanolamine, diethanolamine and monoethanolamine, a reduction accelerator, a carrier, etc., can also be used together. Among them, sodium hydroxide is preferable in view of its price or easiness of handling. Furthermore, it is preferable to carry out, after the above-mentioned aqueous neutral-alkali solution treatment to the staple fiber nonwoven fabric, as required, neutralization and washing to remove residual chemicals or decomposed products and then drying.

As the fluid jet treatment, it is preferable to use a water-jet punching in which water flow is used, in view of working environment. In the water-jet punching treatment, it is preferably carried out in a state of columnar stream of water. The columnar stream can generally be obtained by ejecting water through a nozzle of about 0.06 to about 1.0 mm diameter at a pressure of about 1 to about 60 MPa. For an efficient entanglement and for obtaining a nonwoven fabric of a better surface appearance, it is preferable that a diameter of the nozzle is about 0.06 to about 0.15 mm, and a pitch is about 5 mm or less, and a diameter of about 0.06 to about 0.12 mm, pitch of about 1 mm or less is more preferable. In the case where the treatment is repeated, these nozzle specifications need not be the same. For example, it is possible to use a nozzle of large diameter and a nozzle of small diameter together, but it is preferable to use a nozzle of the above-mentioned specification at least once. When a diameter of nozzle exceeds about 0.15 mm, it is not preferable because entanglements of the ultra-fine fibers with each other decrease, leading to nap and less smooth surfaces. Accordingly, the diameter of nozzle is preferably small, but if it is less than about 0.06 mm, because a clogging of nozzle is likely to occur, which make it necessary to precisely filter the water used and it is not preferable in view of increasing cost. It is also preferable to repeat the fluid jet treatment plurally for the purpose of achieving a uniform entanglement in direction of thickness and/or improving smoothness of surface of the nonwoven fabric.

A pressure of the fluid jet is properly selected according to a weight per unit area of nonwoven fabric to be treated, and it is preferable to become higher as the weight per unit area becomes larger. Furthermore, to highly entangle the ultra-fine fibers with each other to thereby achieve desired physical properties such as tensile strength, tear strength and abrasion resistance, it is necessary to treat, at least once, at a pressure of about 10 MPa or more. It is more preferable that the pressure is about 15 MPa or more and, still more preferably, it is about 20 MPa or more. The upper limit of the pressure is not especially limited, but as the pressure becomes high, its cost also becomes high, and in case of a nonwoven fabric of low weight per unit area, since the nonwoven fabric may become nonuniform and fluffs may generate by fiber breakage, it is preferably about 40 MPa or lower, more preferably about 30 MPa or lower.

In the case where the ultra-fine fibers are obtained from the fiber convertible into ultra-fine fibers, those in which the ultra-fine fibers are entangled in a state of fiber bundle which is grouped are ordinary, but, by carrying out a fluid jet treatment in the above-mentioned conditions, an ultra-fine staple fiber nonwoven fabric in which ultra-fine fibers are entangled with each other in an extent that an entanglement in a state of fiber bundle is hardly observed, can be obtained. In that way, surface characteristics such as abrasion resistance can be improved. Before carrying out the fluid jet treatment, immersing in water may be carried out. Furthermore, to improve surface quality of the nonwoven fabric, a method of relatively moving nozzle head and the nonwoven fabric, or a method of scattering water by inserting a metal mesh between the nonwoven fabric and the nozzle after entanglement, can be applied. Furthermore, before carrying out the fluid jet treatment, it is preferable to split the nonwoven fabric perpendicular to thickness into two or more.

As methods of treatment for making into ultra-fine simultaneously with a fluid jet treatment, for example, a method of removing the sea component and entanglement of ultra-fine fibers by water-jet punching, by using an islands-in-sea type conjugate fiber in which a water soluble polymer is used as the sea component and a method of, after decomposing the sea component by passing through an alkaline treating solution, carrying out final removal of the sea component and entanglement of the ultra-fine fibers by water-jet punching, by using an islands-in-sea type conjugate fiber in which an alkali-decomposable polymer is used as the sea component, etc., are mentioned.

Next, a production method of the woven or knitted fabric (B) is explained. A production method of the conjugate fiber in which two or more polyesters are disposed in side-by-side or eccentric sheath-core type used for the woven or knitted fabric (B) is not especially limited, for example, methods described in JP-B-S63-42021, JP-H4-308271, JP-H11-43835, etc., can be applied. Furthermore, by using these fibers, and by using a proper weaving or knitting machine according to a desired construction, woven or knitted fabrics such as a woven fabric, knitted fabric or the like, can be made.

Next, a process of developing crimp of the conjugate fiber used for the woven or knitted fabric (B) and a process of laminating the woven or knitted fabric (B) and the nonwoven fabric (A) are carried out. The process of developing crimp of the conjugate fiber used for the woven or knitted fabric (B) can also be carried out before or after it is laminated with the nonwoven fabric (A). If it is carried out before the lamination, it is preferable in view of an excellence of surface appearance of the leather-like sheet to be obtained, and if it is carried out after the lamination, it is preferable in view of an improvement of abrasion resistance or peeling strength of the leather-like sheet to be obtained. Furthermore, although it is preferable to carry out an alkali-reduction treatment of the woven or knitted fabric (B), in this case, it is necessary to carry out before the lamination, since if it is carried out after the lamination, even fibers constituting the nonwoven fabric (A) are reduced.

When a relaxation treatment is carried out as a process for developing crimp of the conjugate fiber, it is preferable to sufficiently treat under a wet-heat condition of about 100 to about 140° C. in an expanded state or in a process including crumpling treatment. With respect to the treatment time, the range of about 10 seconds to about 60 minutes is more preferable. The relaxation treatment may be carried out several times. In the case where the relaxation treatment is carried out plurally, respective conditions may be the same or different. Furthermore, in the dyeing process later, it is possible to carry out the dyeing and the relaxation treatment simultaneously, by dyeing under the above-mentioned wet-heat condition.

As methods for laminating the woven or knitted fabric (B) and the nonwoven fabric (A), it is possible to adopt a method of entanglement by means of the above-mentioned needle punching, fluid jet treatment or the like, a method by adhesion, or other various method, alone or in combination. Among these, in view of excellence of peeling strength, a method by entanglement is preferable. Furthermore, entanglement using fluid jet treatment is more preferable in view of being able to entangle without damaging the woven or knitted fabric.

In the case where the nonwoven fabric (A) and the woven or knitted fabric (B) are laminated by entanglement, it is preferable that a degree of entanglement of nonwoven fabric before laminating is rather low, in view of improving peeling strength or abrasion resistance of the leather-like sheet to be obtained. In this case, first, as a precursor of the nonwoven fabric (A), a state in which ultra-fine fiber bundles are entangled, that is, in the above-mentioned method, a nonwoven fabric (A') before fluid jet treatment and after treatment of making into ultra-fine, is prepared. And then, after laminating the woven or knitted fabric (B) on the nonwoven fabric (A'), by carrying out water-jet punching, it is preferable that the ultra-fine fibers in the nonwoven fabric (A') are entangled with each other to be converted into the nonwoven fabric (A) simultaneously with entangling the nonwoven fabric (A) and the woven or knitted fabric (B). It is preferable that the water-jet punching is effected from the side of the nonwoven fabric (A').

Furthermore, after the nonwoven fabric and the woven or knitted fabric (B) are laminated, the above-mentioned needle punching treatment may be carried out. That is, after laminating a staple fiber nonwoven fabric comprising the fiber convertible into ultra-fine fibers with the woven or knitted fabric (B), carrying out needle punching treatment, successively treatment for making ultra-fine and water-jet punching may be carried out. In summary, to carry out needle punching treatment before generating ultra-fine fibers and to carry out water-jet punching simultaneously with or after making ultra-fine fibers is the characteristic feature of the method.

By paying attention to the difference between fibers easy to be entangled by needle punching and fibers easy to be entangled by fluid jet treatment, and by producing in the above-mentioned process, it was found that the excellent leather-like sheet can be obtained easily. That is, it takes an advantage that, in a thick fiber of about 1 to about 10 dtex, entanglement by needle punching is excellent, and in an ultra-fine fiber of about 0.0001 to about 0.5 dtex, entanglement by fluid jet treatment is excellent. Accordingly, for example, a method of carrying out fluid jet treatment to a fiber of about 1 to about 10 dtex, or, a method of carrying out needle punching to an ultra-fine fiber of about 0.0001 to about 0.5 dtex, although it depends on conditions such as a needle to be used, a pressure of fluid jet, a fiber length constituting nonwoven fabric, a weight per unit area of nonwoven fabric, is, in general, inappropriate for obtaining the leather-like sheet.

On the other hand, in the case where a nonwoven fabric and a woven or knitted fabric are laminated by an adhesion, it is preferable that, first, the nonwoven fabric (A) in which ultra-fine fibers are entangled with each other is prepared, and then the nonwoven fabric (A) and the woven or knitted fabric (B) are adhered.

In the case where another nonwoven fabric is further laminated on the back surface, a production method of the nonwoven fabric is not especially limited and it can be appropriately selected according to various uses. For example, by using the same nonwoven fabric as the nonwoven fabric (A) as a nonwoven fabric of back surface, it becomes possible to obtain a leather-like sheet excellent in abrasion resistance on both surfaces. Furthermore, by using the nonwoven fabric (C) of an average fiber length of about 0.1 to about 1 cm as that of back side, it becomes possible to make a weight per unit area small and to improve drapability of the leather-like sheet to be obtained. In this case, it is preferable that the nonwoven fabric (C) is made by a wet laid method. Furthermore, with respect to materials to be used, they may be those imparted functions such as flame retardancy, electrostaticity, anti-bacterial property and deodorizing ability.

Furthermore, in the case where the nonwoven fabric (C) is produced by a wet laid method, a method of laminating a web (C') prepared beforehand by a wet laid method (hereunder, referred to as "the wet laid web (C')") and the woven or knitted fabric (B) and being subjected to an entanglement, a method of directly forming the wet laid web (C') on the woven or knitted fabric (B), or the like can be applied. If possible, the method of directly forming the wet laid web (C') on the woven or knitted fabric (B) is preferable in view of cost. In case where the wet laid web (C') is laminated, if it is done after the nonwoven fabric (A) and the woven or knitted fabric (B) are laminated, it becomes difficult to laminate uniformly due to increase of density, therefore, it is preferable that the wet laid web (C') and the woven or knitted fabric (B) are laminated beforehand and then the nonwoven fabric (A) is laminated. It is preferable that after they are laminated, by carrying out a fluid jet treatment, fibers constituting the wet laid web (C') are entangled with each other to convert it into the nonwoven fabric (C) and simultaneously with it, the nonwoven fabric (C) and the woven or knitted fabric (B) are entangled.

The production method of the wet laid web (C') is not especially limited, but for example, it can be produced by subjecting a dispersion in which fibers of an average fiber length about 0.1 to about 1 cm are beaten in water containing a water soluble resin or the like and dispersed in a concentration of about 0.0001 to about 0.1%, to a wet laid process on a metal mesh or the like. In case where the wet laid web (C') is directly formed on the woven or knitted fabric (B), it is possible to produce by a method in which the woven or knitted fabric is put on a metal mesh and thereon a wet laid process is carried out.

The leather-like sheet thus obtained may be further subjected to other treatment, as required.

In the case where a leather-like sheet with suede-like or nubuck-like naps is desired, it is preferable that surface of the leather-like sheet is subjected to a raising treatment by sandpaper, brush or the like. It is preferable that such a raising treatment is carried out before dyeing since, if it is carried out after dyeing process mentioned later, a coloration of the sandpaper or brush arises. Furthermore, it can be done after imparting the fine particle mentioned later, but it may cause a difficulty of raising naps, it is preferable that it is done before imparting the fine particle.

It is preferable that thus obtained leather-like sheet is dyed. The dyeing method is not especially limited, and as dyeing machines used, any one of jet dyeing machine, thermosol dyeing machine, high pressure jigger dyeing machine or the like, is acceptable but in view of excellence of hand of the leather-like sheet to be obtained, it is preferable to dye by a jet dyeing machine. The condition of dyeing process is not especially limited, but in case where the above mentioned relaxation treatment is carried out together, it is preferable to carry out by a jet dyeing machine at about 100 to about 140° C. for about 1 to about 60 minutes. It is more preferable that the treatment time is about 10 to about 60 minutes.

Furthermore, it is also preferable to compress the leather-like sheet from about 0.1 to about 0.8 times after dyeing, in order to improve surface smoothness of the leather-like sheet and/or in order to obtain a semi-grain surface.

As methods for imparting fine particles to the leather-like sheet, it can be suitably selected from padding method, a method using jet dyeing machine or jigger dyeing machine, spraying method by spray, or the like. Furthermore, it is also the same in case where a softening agent is imparted to the leather-like sheet, and in view of cost, it is preferable that the softening agent is imparted simultaneously with the fine particle.

Furthermore, the fine particle or the softening agent is preferably imparted after dyeing. If they are imparted before dyeing, it is not preferable since there is a case where their effect decreases by falling off at dyeing, or color unevenness occurs.

EXAMPLES

Hereunder, we explained the sheets and methods in more detail with reference to Examples. Here, the physical properties in Examples are determined according to the methods mentioned below:

(1) Weight Per Unit Area and Apparent Fiber Density

The weight per unit area of the leather-like sheet was measured according to the method described in JIS L1096 8.4.2 (1999). The thickness of the leather-like sheet was measured by a dial thickness gauge (product of Ozaki Mfg. Co., Ltd.; tradename, "Peacock H") and the value of weight per unit area was divided by the value of thickness to obtain the apparent fiber density.

(2) Martindale Abrasion Test

A test piece of 3.8 cm diameter is cut out from a leather-like sheet and weighed. An abrasion resistance test was carried out according to JIS L 1096 (1999) 8.17.5 E method (Martindale method) with the load for furniture (12 kPa), using Martindale abrasion test machine. When surface to be the front surface is rubbed 20,000 times, the machine was stopped and measured the weight loss of the test piece after the test to before the test. In addition, the number of pills was counted from appearance of the test piece after the test.

(3) Repulsive Feeling

Leather-like sheets are evaluated in 4 classes by sensual evaluation.

Repulsive feeling: good: A, average: B, rather poor: C, poor: D.

(4) Measurement of Fiber Length

From arbitrary 3 portions of the nonwoven fabric, 100 fibers were drawn out respectively and measured their fiber length. A number average of the 300 fiber lengths measured was obtained.

(5) Measurement of Fiber Fineness

A cross section of nonwoven fabric was observed by an optical microscope. 100 cross sections of fiber are selected randomly to measure their cross-sectional area, and obtained a number average of the 100 cross-sectional areas of fiber. From the obtained average value of cross-sectional area of the fiber and a specific gravity of the fiber, a fiber fineness was obtained by calculation. Here, the specific gravity of fiber was measured according to JIS L 10.15.

(6) Drape Coefficient and Node Number

Drapability of the leather-like sheet was measured by a drape tester (type: YD-100 of Daiei Kagaku Seiki Mfg. Co., Ltd.) according to JIS L 1096 (1999) 8.19.7 G method (drape coefficient). It was measured by changing the condition prescribed in the JIS that "sample table is vibrated up and down 3 times" to a condition that "sample table is rotated for 2 minutes". This condition is the standard using condition of the above-mentioned tester. Furthermore, a number of pleats counted in the projection obtained by the drape coefficient test was defined as the node number. Here, the measurement was repeated 3 times for both surfaces, respectively, and average values thereof were defined as those values.

Reference Example 1

A low viscosity component of 100% polyethylene terephthalate of intrinsic viscosity 0.40 and a high viscosity component of polyethylene terephthalate of which intrinsic viscosity is 0.75, were joined in weight conjugate ratio of 50/50 in side-by-side type, and spun and drawn to obtain a conjugate yarn of 110 dtex/24 filaments. This was additionally twisted by 1300 T/m, and steam set at 65° C. By using this yarn, a woven fabric (B) was produced in a weaving density of 180× 90 yarns/inch. When this woven fabric alone was subjected to a relaxation treatment at 110° C. by a jet dyeing machine, its weaving density was 250×120 yarns/inch.

Reference Example 2

A low viscosity component of 100% polyethylene terephthalate of intrinsic viscosity 0.40 and a high viscosity component of polyethylene terephthalate of which intrinsic viscosity is 0.75, were joined in weight conjugate ratio of 50/50 in side-by-side type, and spun and drawn to obtain a conjugate yarn of 56 dtex/12 filaments. This was additionally twisted by 1500 T/m, and steam set at 65° C. By using this yarn, a woven fabric (B) was produced in a weaving density of 94×85 yarns/inch. When this woven fabric alone was subjected to a relaxation treatment at 110° C. by a jet dyeing machine, its weaving density was 136×114 yarns/inch.

Reference Example 3

By using the same yarn as that of Reference example 2, a tricot (knitted fabric (B)) of 28 gauges was prepared. Next the same relaxation treatment as that of Reference example 1 was carried out.

Example 1

An islands-in-sea type conjugate staple fiber of average fiber fineness of 3 dtex, 36 islands and average fiber length of 51 mm comprising 45 parts of polystyrene as sea component and 55 parts of polyethylene terephthalate as island component was passed through a card and a crosslapper to form a web. The obtained web was subjected to a needle punching treatment at a punching density of 1500 needles/cm$^2$ by a punching machine with 1 barb type needles to obtain a conjugate staple fiber nonwoven fabric of apparent fiber density of 0.21 g/cm$^3$. Next, it was immersed in an aqueous solution heated to 95° C., for 2 minutes, of 12% polyvinyl alcohol (PVA) of polymerization degree of 500 and saponification degree of 88% to thereby the nonwoven fabric be impregnated with the PVA so that the solid amount would be 25% to the weight of the nonwoven fabric, and simultaneously, subjected to a shrinkage treatment. After that, the nonwoven fabric was dried at 100° C. to remove water. Next, by treating this conjugate staple fiber nonwoven fabric with 30° C. trichlene until the polystyrene was completely removed, ultra-fine fibers of average fiber fineness of 0.046 dtex were developed from the conjugate staple fiber. Thus obtained ultra-fine staple fiber nonwoven fabric was split in a direction perpendicular to the thickness into two sheets by a standard splitting machine of Murota Industrial Machinery Co., Ltd. to obtain a nonwoven fabric (A') which is a precursor of the nonwoven fabric (A). Next, woven fabric (B) prepared by Reference example 1 (before relaxation treatment) was laminated on the nonwoven fabric (A') and subjected to water-jet punching treatments of 10 MPa and 20 MPa, respectively, from the nonwoven fabric (A') side by a water-jet punching machine having a nozzle head of 0.1 mm orifice diameter and 0.6 mm pitch, at a treating speed of 1 m/min, subsequently, it was subjected once to a water-jet punching treatment of a pressure of 10 MPa from the knitted fabric side. By these water-jet punching treatments, the PVA was removed from the nonwoven fabric, and ultra-fine fibers in the nonwoven fabric (A') were entangled with each other to be converted into the nonwoven fabric (A) and simultaneously, the nonwoven fabric (A) and the woven or knitted fabric (B) were entangled. The obtained sheet was, subsequently subjected to a shrinkage treatment in an expanded state by 100° C. hot water for 2 minutes.

A surface of thus obtained laminated sheet was subjected to a raising treatment by a sandpaper. In addition, the laminated sheet was dyed by a jet dyeing machine by using "Sumikaron Blue S-BBL200" (product of Sumika Chemtex Co., Ltd.) at a concentration of 20% owf and at 120° C. for 45 minutes. The obtained sheet was immersed into an aqueous solution containing a softening agent (amino-modified silicone emulsion "Aldack AN980SF" of Ipposha Oil Industries Co., Ltd.) and a fine particle (colloidal silica "Snowtex (tradename) 20L" of Nissan Chemical Industries., Ltd, average particle diameter, 0.04 to 0.05 μm: BET method) and was squeezed so that the amount of colloidal silica would be 0.1%, and then dried at 100° C. while being brushed. Thus obtained leather-like sheet containing the nonwoven fabric (A) and the woven fabric (B) had a dense structure in which ultra-fine fibers were entangled with each other, and exhibited a hand with a repulsive feeling and a compactness. Evaluation results of the obtained leather-like sheet are shown in Table 1. As a result of observation of the cross section of the leather-like sheet by SEM, as shown in FIG. 1, fibers constituting the woven fabric (B) became spiral, and it could be confirmed that they formed a hollow structure in center portion along the length direction.

Example 2

A wet laid web (C') of weight per unit area of 20 g/m$^2$ was prepared by using a polyethylene terephthalate fiber of average fiber length of 0.5 cm and an average single fiber fineness of 0.1 dtex by a wet laid method. This was laminated on the woven fabric (B) prepared by Reference example 1 (before relaxation treatment) and subjected to a water-jet punching treatments of 5 MPa and 10 MPa, respectively, from the wet laid web (C') side by a water-jet punching machine having a nozzle head of 0.1 mm orifice diameter and 0.6 mm pitch, at a treating speed of 1 m/min. By these water jet punching treatments, the wet laid web (C') was converted into a nonwoven fabric (C) and simultaneously the woven fabric (B) and the nonwoven fabric (C) were entangled to obtain a laminated product of the woven fabric (B) and the nonwoven fabric (C). Next, the nonwoven fabric (A') prepared in Example 1 was laminated on the opposite side of the nonwoven fabric (C) so that the woven fabric (B) was positioned in center, and subjected to water-jet punching treatments of 10 MPa and 20 MPa from the nonwoven fabric (A') side at a treating speed of 1 m/min. By these water-jet punching treatments, ultra-fine fibers in the nonwoven fabric (A') were entangled with each other to convert it into a nonwoven fabric (A) and simultaneously the nonwoven fabric (A) and the woven or knitted fabric (B) were entangled. Subsequently, it was subjected to a shrinkage treatment by 100° C. hot water for 2 minutes in an expanded state. Thus obtained laminated sheet was subjected to a raising treatment and dyeing in the same way as Example 1, and imparted with a softening agent and a fine particle to thereby obtain a leather-like sheet comprising the nonwoven fabric (A)/woven fabric (B)/nonwoven fabric (C). The obtained leather-like sheet had a dense structure in which the ultra-fine fibers were entangled with each other and a hand very excellent in repulsive feeling and compactness, and, in addition, was excellent in surface appearance. The results of evaluation of the obtained leather-like sheet are shown in Table 1.

Example 3

Figure 2:
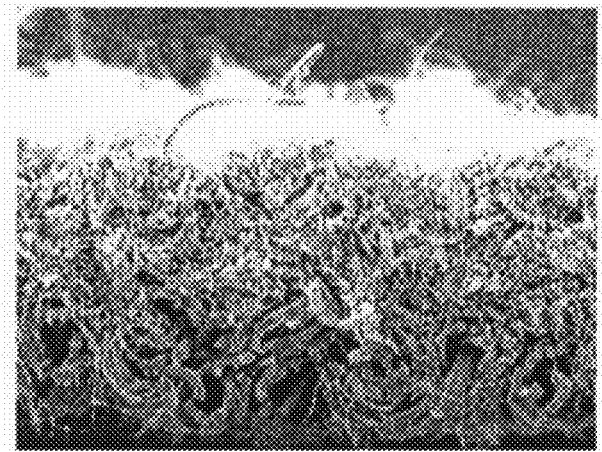
FIG. 2: A cross sectional view of the leather-like sheet obtained in Example 3.

A leather-like sheet was obtained in the same way as Example 1, except using the woven fabric (B) prepared in Reference example 2 (after relaxation treatment) as a woven fabric (B) and without the shrinkage treatment by 100° C. hot water. Thus obtained leather-like sheet was, compared to Example 1, a little bit poor in repulsive feeling but, more excellent in surface appearance and, similar to Example 1, had a hand with compactness. The results of evaluation of the leather-like sheet are shown in Table 1. Furthermore, as a result of observation of the cross section of the leather-like sheet by SEM, as shown in FIG. 2, some of fibers constituting the knitted fabric (B) became spiral, and it could be confirmed that they formed a hollow structure in center portion along the length direction. Furthermore, as a result of evaluation of drapability of this leather-like sheet, the drape coefficient was 0.41 and the node number was 5.5.

Example 4

A leather-like sheet was obtained in the same way as Example 3, except using the knitted fabric (B) prepared in Reference example 3 (after relaxation treatment) instead of the woven fabric (B). Thus obtained leather-like sheet had a hand rich in compactness similar to Example 3. As a result of observation of the cross section of the leather-like sheet by SEM, some of fibers constituting the knitted fabric (B) became spiral, and it could be confirmed that they formed a hollow structure in center portion along the length direction. Furthermore, as a result of evaluation of drapability of this leather-like sheet, the drape coefficient was 0.32 and the node number was 6.5. Compared to the leather-like sheet of Example 3, it had a better drapability, but its repulsive feeling was rather poor.

Comparative Example 1

Figure 3:
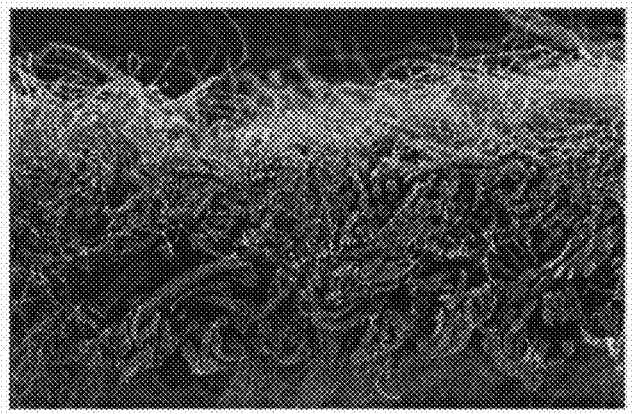
FIG. 3: A cross sectional view of the leather-like sheet obtained in Comparative Example 1.

A leather-like sheet was obtained in the same way as Example 1 except using a double circular knit fabric of 44 gauge and a weight per unit area of 77 g/m$^2$ comprising a polyethylene terephthalate yarn of 33 dtex, 12 filaments instead of the woven fabric (B). The obtained leather-like sheet was poor in repulsive feeling, although it had stretchability in weft direction. Evaluation results of the leather-like sheet are shown in Table 1. As a result of observation of the cross section of the leather-like sheet by SEM, as shown in FIG. 3, a structure in which fibers constituting the woven fabric became spiral to form a hollow structure in center portion along the length direction, could not be confirmed.

Comparative Example 2

A web was prepared by using an islands-in-sea-type conjugate staple fiber of average single fiber fineness 3 dtex, 36 islands and average fiber length 51 mm comprising 45 parts of polystyrene as the sea component and 55 parts of polyethylene terephthalate as the island component, and by passing through a card machine and a crosslapper. Next, it was subjected to a needle punching treatment at a punching density of 1500 needles/cm$^2$ by a punching machine with 1 barb type needles to obtain a conjugate staple fiber nonwoven fabric of apparent fiber density of 0.21 g/cm$^3$. Next, it was immersed in an aqueous solution heated to 95° C., for 2 minutes, of 12% polyvinyl alcohol of polymerization degree of 500 and saponification degree of 88% to thereby the nonwoven fabric be impregnated with the PVA so that the solid amount would be 25% to the weight of the nonwoven fabric, and simultaneously, subjected to a shrinkage treatment. After that, the nonwoven fabric was dried at 100° C. to remove water. Next, by treating this conjugate staple fiber nonwoven fabric with 30° C. trichlene until the polystyrene was completely removed, ultra-fine fibers of average single fiber fineness of 0.046 dtex were developed from the conjugate staple fiber. Thus obtained ultra-fine staple fiber nonwoven fabric was split in direction perpendicular to the thickness into two sheets by a standard splitting machine of Murota Industrial Machinery Co., Ltd. to obtain a nonwoven fabric (A') which is a precursor of the nonwoven fabric (A). Next, the nonwoven fabric (A'), without laminating a woven fabric, was treated on both side by a water-jet punching machine having a nozzle head of 0.1 mm orifice diameter and 0.6 mm pitch, at a treating speed of 1 m/min and at pressures of 10 MPa and 20 MPa to thereby carry out entanglement together with PVA removal.

Subsequently, raising treatment, dyeing and imparting softening agent and fine particle were carried out in the same way as Example 1, to obtain a leather-like sheet. The obtained leather-like sheet had a dense structure in which ultra-fine fibers were entangled with each other and was excellent in abrasion resistance and compactness, but it was poor in repulsive feeling. Evaluation results of the leather-like sheet are shown in Table 1.

TABLE 1

| | Weight (g/m$^2$) | Apparent density (g/cm$^3$) | Martindale abrasion | | Repulsive feeling |
| --- | --- | --- | --- | --- | --- |
| | | | Wt loss (mg) | Pilling (number) | |
| Example 1 | 380 | 0.433 | 1.5 | 0 | A |
| Example 2 | 436 | 0.428 | 1.7 | 0 | A |
| Example 3 | 180 | 0.335 | 2.0 | 1 | B |
| Comparative example 1 | 173 | 0.320 | 3.7 | 1 | C |
| Comparative example 2 | 210 | 0.300 | 3.6 | 1 | D |

INDUSTRIAL APPLICABILITY

It is possible to provide a leather-like sheet which is excellent in abrasion resistance and in repulsive feeling, although it substantially comprises a fibrous material.

The leather-like sheet can preferably be used especially for clothes, furniture, car sheet or the like in which repulsive feeling or moldability is required.

The invention claimed is:
1. A leather-like sheet substantially not containing polyurethane and comprising a fibrous material, wherein a staple fiber nonwoven fabric (A), in which ultra-fine fibers of an average single fiber fineness of about 0.0001 to about 0.5 dtex and an average fiber length of about 1 to about 10 cm are entangled with each other, and a woven or knitted fabric (B) comprising a conjugate fiber in which two or more polyesters are disposed in side-by-side or eccentric sheath-core relationship, are laminated.

2. The sheet according to claim 1, wherein an average fiber length of fibers constituting said nonwoven fabric (A) is about 1.5 to about 8 cm.

3. The sheet according to claim 1, wherein, in the woven or knitted fabric (B), fibers comprising said conjugate fiber constitute a spiral multi-filament and a group of said multi-filaments constitutes a spiral structure and forms a longitudinal hollow structure in a center portion of the spiral structure.

4. The sheet according to claim 1, wherein a twist number of the fibers comprising said conjugate fiber is about 500 to about 3000 T/m.

5. The sheet according to claim 1, containing fine particles.

6. The sheet according to claim 1, wherein the woven or knitted fabric (B) is about 5 to about 50% of the total weight.

7. The sheet according to claim 1, wherein the woven or knitted fabric (B) is a woven fabric.

8. The sheet according to claim 1, wherein a staple fiber nonwoven fabric (C) in which ultra-fine fibers of average fiber length of about 0.1 to about 1 cm are entangled with each other, is further laminated.

9. The sheet according to claim 1, wherein a fiber material constituting the nonwoven fabric (A) is a polyester.

10. The sheet according to claim 1, having naps at least on one surface.

11. The sheet according to claim 1, having a weight per unit area of about 150 to about 550 g/m$^2$ and apparent fiber density of about 0.25 to about 0.70 g/cm$^3$.

12. The sheet according to claim 1, wherein, in the abrasion test by Martindale method, by 20,000 times abrasions on at least one surface, an abrasion loss is about 20 mg or less and a number of pills is about 5 or less.

13. The sheet according to claim 1, having a drape coefficient of about 0.10 to about 0.50.

14. The sheet according to claim 1, having a node number of about 5 to about 15.

15. A method of producing a leather-like sheet that substantially does not contain polyurethane comprising 1) obtaining an ultra-fine staple fiber nonwoven fabric (A') in which staple fibers convertible into ultra-fine fibers of an average single fiber fineness of about 1 to about 10 dtex which are convertible into ultra-fine fibers of an average single fiber fineness of about 0.0001 to about 0.5 dtex and an average fiber length of about 1 to about 10 cm are entangled by needle punching and then converted into ultra-fine fibers, and 2) laminating said nonwoven fabric (A') on a woven or knitted fabric (B) comprising a conjugate fiber in which two or more polyesters are disposed in side-by-side or eccentric sheath-core relationship and subjecting (A') and (B) to a fluid jet treatment at a pressure of at least about 10 MPa to entangle the ultra-fine fibers in the nonwoven fabric (A') with each other to convert it into a nonwoven fabric (A) simultaneously with entangling the nonwoven fabric (A) and the woven or knitted fabric (B).

16. The method according to claim 15, further comprising laminating a wet laid web (C') of ultra-fine fibers of an average fiber length of about 0.1 to about 1 cm to the woven or knitted fabric (B) on the surface opposite of the ultra-fine staple fiber nonwoven fabric (A').

17. The method according to claim 16, wherein the wet laid web (C') and the woven or knitted fabric (B) are laminated and entangled by the fluid jet treatment and then the non-woven fabric (A') is laminated thereon and entangled by the fluid jet treatment.

18. The method according to claim 15, further comprising dyeing at least a portion of the sheet.

19. The method according to claim 18, further comprising imparting fine particles after the dyeing.

* * * * *